United States Patent Office
3,488,971
Patented Jan. 13, 1970

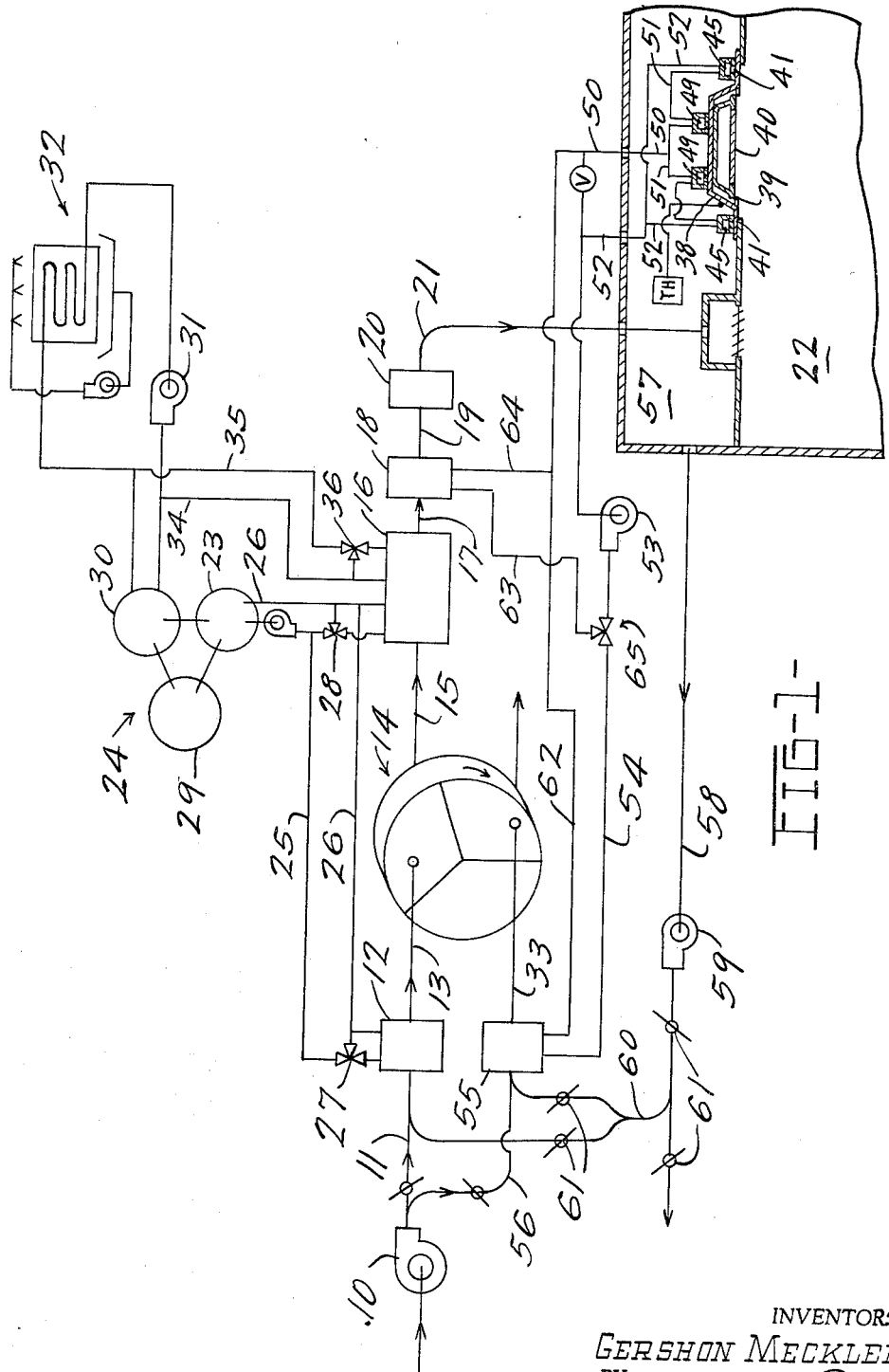

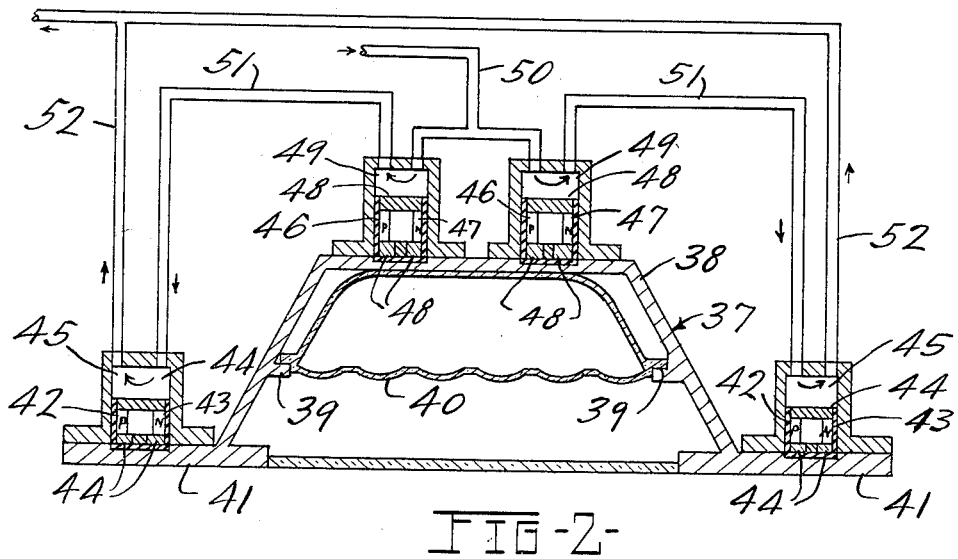
FIG-2-
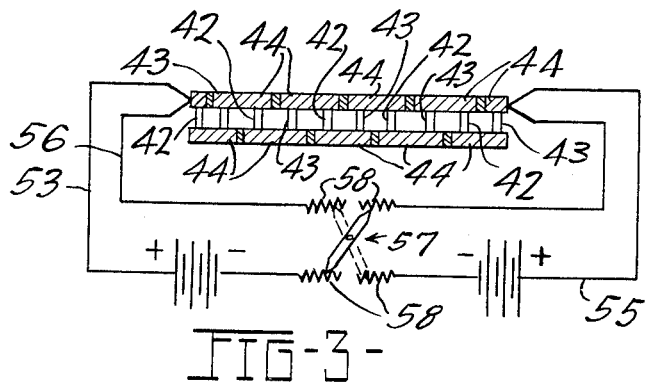
FIG-3-
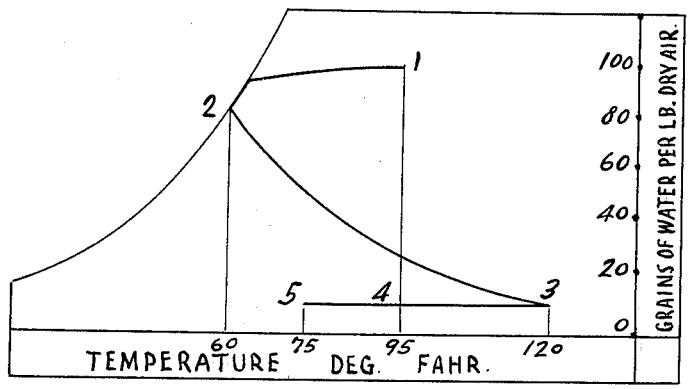
FIG-4-

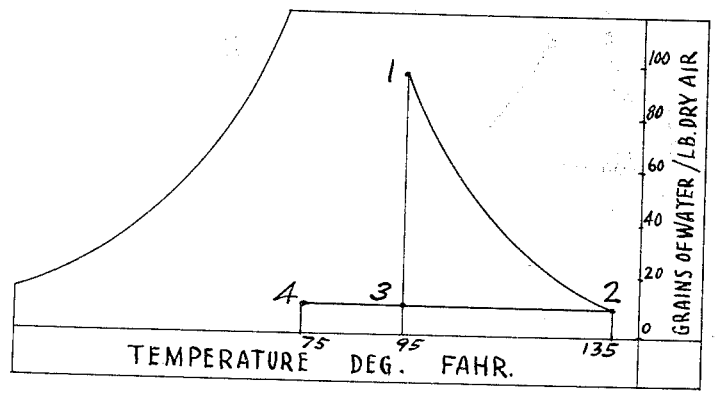
FIG-5-
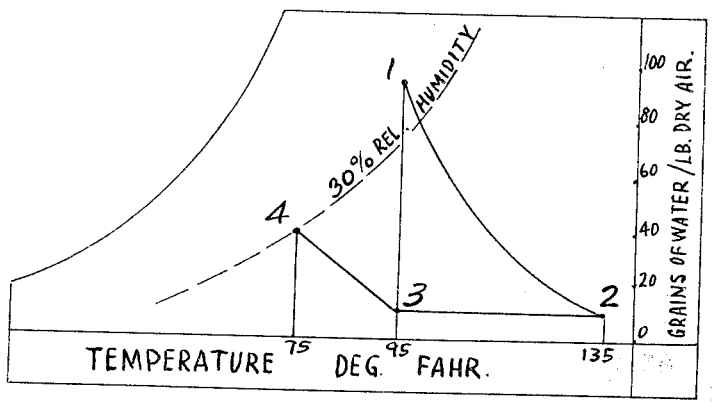
FIG-6-
INVENTOR:
GERSHON MECKLER.
BY
ATT'YS.

3,488,971
COMFORT CONDITIONING SYSTEM
Gershon Meckler, 2750 Ridge Valley Road,
Atlanta, Ga. 30327
Filed Apr. 29, 1968, Ser. No. 724,867
Int. Cl. F25d 21/02, 23/12
U.S. Cl. 62—3        12 Claims

ABSTRACT OF THE DISCLOSURE

Air for comfort conditioning is circulated through a chemical dehumidifier and to a space to be conditioned. Optional sensible cooling coils before and after chemical dehumidification are provided. Most of the lighting heat and most of the space load are transferred to relatively high temperature water, and from the water to the chemical dehumidifier for regeneration of the desiccant therein. A thermally activated heat pump, which can be of the thermoelectric type, is used to transfer heat to the high temperature water.

BACKGROUND OF THE INVENTION

A recent trend in office and other buildings for human occupancy is toward increasingly higher lighting levels. Since a major portion of the electrical energy utilized to energize light sources is converted to heat, the tendency toward higher lighting intensities imposes a heavy load on associated air conditioning apparatus. Not only are large cooling systems, usually of the compressor-condenser-evaporator type or of the absorption type, required, but, also, large quantities of conditioned air must be circulated. Circulation of the large quantities of conditioned air requires a high pressure system, which is expensive, or, for a low pressure system, large risers, ducts, blowers and the like, with the result that a substantial percentage of the total cubage of an adequately air conditioned building having a high-lighting intensity may be used for the air handling portion of the air conditioning system.

THE PRESENT INVENTION

The present invention is based upon the discovery of an air conditioning system wherein air is conditioned by circulation through a chemical dehumidifier, while heat from lghts used to provide the highlighting intensity and heat from the space or spaces being conditioned is transferred to relatively high temperature water. Heat is then transferred from the water to the chemical dehumidifier, in regenerating relationship with the desiccant therein. The chemical dehumidifier enables adequate humidity control with minimum air flow, whilte transfer of lighting and space loads to the high temperature water minimizes, and in some cases eliminates altogether, the sensible cooling load which must be carried by circulated, conditioned air. Use of the heat in the high temperature water for regeneration eliminates the objection that is militated against the use of chemical dehumidifiers in most office and other occupied buildings. This problem is the high energy requirement for regeneration of the desiccant of a chemical dehumidifier. In apparatus according to the invention the energy for regeneration is heat that would otherwise be waste, and, in most air conditioning systems, would be problem heat which would have to be counteracted by mechanical refrigerating capacity.

OBJECTS OF THE INVENTION

It is, therefore, an object of the invention to provide improved air conditioning apparatus.

It is a further object of the invention to provide air conditioning apparatus wherein air is circulated through a chemical dehumidifier and to a space to be conditioned, while heat from the space and generated as an incident of the lighting of the space is transferred to relatively high temperature water, and from the water to the chemical dehumidifier in regenerating relationship with desiccant therein.

Other objects and advantages will be apparent from the description which follows, reference being made to the accompanying drawings, in which:

BRIEF DESCRIPTION OF DRAWINGS

FIG. 1 is a schematic diagram of apparatus according to the invention.

FIG. 2 is an enlarged view of a combined heat pump and lighting fixture which is an important component of the apparatus of FIG. 1.

FIG. 3 is a partially schematic view showing details of a thermoelectric circuit of the lighting fixture of FIG. 2.

FIG. 4 is a chart showing the psychometric state of air at various points in the apparatus of FIG. 1, according to one mode of operation.

FIG. 5 is a chart showing the psychometric state of air at various points in the apparatus of FIG. 1, operated in a modified manner.

FIG. 6 is a chart showing the psychometric state of air conditioned in the apparatus of FIG. 1, and operated in a still different manner.

DESCRIPTION OF THE PREFERRED EMBODIMENTS

Referring, now, in more detail to FIG. 1, apparatus according to the invention comprises a blower 10, a duct 11, a chiller 12, a duct 13, a chemical dehumidifier 14, a duct 15, a chiller 16, a duct 17, a heater 18, a duct 19, a washer 20, and a duct 21 to a space 22 to be conditioned.

Chilled water from the evaporator 23 of conventional refrigerating apparatus 24 is made available to sensible cooling coils (not shown) within the chillers 12 and 16 through supply lines 25 and return lines 26. Modulating valves 27 and 28 so that all or any desired part of the chilled water in the line 25 can be bypassed directly to the line 26, as required for control purposes, without flowing through the coils in the chillers 12 and 16.

The apparatus 24 is of a conventional type, comprising, in addition to the evaporator 23, a compressor 29 and a condenser 30. Heat is transferred from the condenser 30 to water circulated by a pump 31, from a cooling tower 32 into heat exchange relationship with the condenser 30, and back to the tower 32.

The chemical dehumidifier 14 is of the segmented disc-type, and contains a solid desiccant such as activated alumina, silica gel or the like. Air from the duct 13 flows through a segment of the dehumidifier 14 which contains regenerated desiccant, while air from a duct 33 flows through a different segment of the dehumidifier 14 for regeneration of desiccant in that segment, as subsequently described in more detail.

The dehumidification of air in the dehumidifier 14 involves the conversion of a substantial amount of latent heat to sensible heat, so that air in the duct 15 is at a temperature considerably higher than that of air in the duct 13. As a consequence, it is sometimes possible to remove some of the sensible heat from air leaving the dehumidifier 14 without the necessity for employing chilled water. Accordingly, the chiller 16 has two compartments. The first compartment contains a sensible coil (not illustrated) to which evaporatively cooled water from the tower 32 can be supplied through supply and return lines 34 and 35. A valve 36 enables the bypassing of all or any part of the evaporatively cooled water directly from the line 34 to the line 35 without passing through the sensible coil. The chilled water coil (not illustrated) of the chiller 16 is in the second compartment, and is used to provide any desired supply air temperature lower than the minimum achievable with evaporatively cooled water.

A combined lighting fixture and heat pump 37 has an important component of apparatus according to the invention. The combined fixture heat pump comprises a reflector 38, fixtures 39 in which a light source 40 for artificial light is mounted for illumination of the space 22. Wings 41 constitute cooling means for the space 22. As shown in FIG. 2, the flanges 41 are in thermal contact with cold junctions of a thermoelectric circuit comprising P-type elements 42, N-type elements 43, and plates 44. The hot junctions of the thermoelectric circuit are in thermal contact with water circulated through a chamber 45, as subsequently described in more detail, so that, when the circuits are appropriately energized, heat is pumped from the flanges 41 and the associated cold junctions to the hot junctions and from thence to the circulated water.

The combined fixture and heat pump 37 also includes a second thermoelectric circuit comprising P-type elements 46, N-type elements 47, and plates 48. Hot junctions of this thermoelectric circuit are heated by heat energy released by the light source 40 while the cold junctions thereof are made cold by circulation of water through passages 49 in thermal contact therewith. A direct current EMF is generated by the thermoelectric circuit made up of the P-type elements 46, the N-type elements 47 and the plates 48, as a consequence of the heating of the hot junctions thereof by the light source 40 while the cold junctions thereof are maintained at a lower temperature by circulation of water through the passages 49. This EMF is used, as subsequently explained in more detail, as the energizing current for the thermoelectric circuit comprising the P-type elements 42, the N-type elements 43 and the plates 44.

Water flow in the combined fixture and heat pump 37 is from a source, subsequently discussed in more detail, through a line 50 to the passages 49, from the passages 49 through lines 51 to the passages 45, and from the passages 45 through lines 52 back to the source.

Referring now to FIG. 3, the thermoelectric circuit comprising the P-type elements 42, the N-type elements 43 and the plates 44 is energized by direct current from the circuit comprising the plates 48 by conductors 53 and 54, or by conductors 55 and 56, depending upon the position of a switch 57. The EMF from the thermoelectric circuit comprising the plates 48 is conventionally represented as two sources to simplify the representation, but would, in fact, be a single source connected into the circuit at each of the two points. The switch 57 includes resistance wires 58, so that the current supplied to the associated thermoelectric circuit can be varied from a maximum to a minimum in either direction. Since the thermoelectric circuit pumps heat from the flanges 41 to water circulated through the passage 45 when flow is in one direction, and from water circulated through the passage 45 to the flanges 41 when current flow is in the opposite direction, and since the amount of heat pumped depends upon the magnitude of the applied current, it will be apparent that a simple thermostatic control can be used to position the switch 57 as required to compensate for substantial changes in heat load on the space 22.

Referring again to FIG. 1, water from the lines 52 is delivered by a pump 53 through a line 54 to an indirect heat exchanger 55. Ambient air from the pump 10 is delivered to a duct 56 and from thence to the indirect heat exchanger 55, or relief air from the space 22 or from a plenum 57 is withdrawn through a duct 58 by a blower 59, then delivered by a duct 60 and delivered to the indirect heat exchanger 55, or a combination of air from the blowers 10 and 59 is delivered to the indirect heat exchanger 55, depending upon operating requirements and the positions selected for various dampers 61. In passing through the indirect heat exchanger 55 air is heated by contact with a sensible coil (not shown) through which water from the line 54 is circulated. In a typical instance, the water in the line 54 may be at a temperature in the vicinity of 150° F., so that, after heat exchange, air delivered to the duct 33 for regeneration of desiccant in the dehumidifier 14 is at a temperature sufficiently high to accomplish this result. Water cooled in the indirect heat exchanger 55 by heat transfer with circulated air, as described, is returned through a line 62 to the line 50.

Under some conditions of operation of an air conditioning system according to the invention heating of air delivered to the space 22 through the duct 21 is desired. This can be accomplished by circulating all or a part of the water from the line 54 through a line 63 to the heater 18, where it is circulated through in indirect heating coil (not illustrated) and then returned through a line 64 to the line 62. A modulating valve 65 controls water flow to the heater 18. When heating of air delivered through the duct 21 to the space 22 is desirable, humidification thereof is usually advantageous, in addition. This can be accomplished in the washer 20 merely by spraying water as required directly into air circulated therethrough. The washer 20 can also serve a refrigerating function when water supplied to the indirect heat exchanger 55 has more available heat energy than is required to regenerate the dehumidifier 14, if operated only to remove enough moisture for humidity control in the space 22. The excess heat energy can still be used for regeneration, and the dehumidifier 14 can be operated to reduce the moisture content of air delivered to the duct 15 lower than is required for humidity control. In this case, the circulated air can then be humidified, and consequently cooled, in the washer 20. The washer then carries a part of the total air conditioning load which would otherwise be carried by the refrigerating apparatus 24.

Typical operation of the apparatus of FIG. 1 is illustrated psychometrically in FIGS. 4 through 6. Referring to FIG. 4, entering air, represented by a point 1, may have a dry bulb temperature of 95° F. and contain approximately 100 grains of water per pound of dry air. The chiller 12 can be operated to cool, and slightly dehumidfy, the air circulated therethrough to the condition represented by a point 2, dry bulb temperature about 60° F., about 80 grains of water per pound of dry air. The dehumidifier 14 can deliver to the duct 15 heated and dehumified air having the conditions represented by a point 3, about 135° F. and 10 grains of water per pound of dry air. Water from the cooling tower 31, in the first part of the chiller 16, can then cool the air to a condition represented by a point 4, about 95° F., and chilled water from the evaporator 23, in the second part of the chiller 16, can then cool the air further to a condition represented by a point 5, dry bulb temperature of 75° F.: 10 grains of water per pound of dry air. In this case, neither the heater 18 nor the washer 20 would be used, and the substantially neutral air would be delivered to the space 22. Substantially all of the space load is then carried by the combined light fixture and heat pump 37, and the energy absorbed is used, as described, to regenerate the dehumidifier 14.

Referring to FIG. 5, entering air is represented by a point 1 as at a dry bulb temperature of about 95° F. and containing about 100 grains of water per pound of dry air. In the mode of operation represented in FIG. 5, the chiller 12 is not operated, i.e., the valve 27 is set to direct water from the line 25 to the line 26, bypassing the chiller 12, so that ambient air is delivered to the dehumidifier 14. This air is dehumidified and heated to a condition represented by a point 2, dry bulb temperature about 135° F., and containing about 10 grains of water per pound of dry air. Water from the cooling tower 12, in the first sensible coil (not illustrated) of the chiller 16 then cools the air, and water in the second sensible coil (not illustrated) cools the air to a condition represented by a point 4, 75° F. Otherwise, operation of the apparatus of the invention in the indicated manner is the same as discussed above in connection with FIGURE 4.

Referring to FIG. 6, the same inlet air conditions are assumed, as shown by a point 1; the chiller 12 is not operated, so the dehumidifier 14 operates as described above in connection with FIG. 5, as does the first sensible coil (not illustrated) in the chiller 16, again using water from the cooling tower 32. The second sensible coil (not illustrated) in the chiller 16, however, is not operated; instead, the washer 20 is used to spray air circulated therethrough to about 30 percent relative humidity, as indicated by a point 4, 75° F.

The invention has been described relative to a single space 22. It is to be understood, however, that the apparatus is particularly suited for operation in a relatively large building, having a plurality of spaces subjected to heat loads which vary substantially from time to time during the course of a day. Each space contains one or a plurality of combined light fixtures and heat pumps 37, so that the water delivered to the indirect heat exchanger 55 is from a relatively large number of the combined light fixtures and heat pumps 37. The light source 40 has been represented as of the "Lucalux"-type, a high-temperature, desirable light source which has found little use in indoor installations because of the air conditioning problems previously associated therewith. Such a light source is desirable in the combined fixture according to the invention because the relatively high temperatures needed for regeneration of the dehumidifier 14 are readily achieved. However, other light sources can be used, including even relatively low temperature sources, and the heat pumping thermoelectric circuit can be cascaded, if necessary, to achieve the required temperatures. With relatively low temperature light sources, it may be desirable to provide for separate water circulation through the channels 49, at a lower temperature, and through the channels 45, at the higher temperature required for regeneration.

A chemical dehumidifier of the liquid desiccant type can be used in place of the solid desiccant dehumidifier 14. In this case, the liquid desiccant, e.g., an ethylene glycol, would ordinarily be flowed over a contactor within the dehumidifier, while water from a cooling tower was circulated through the contactor. In this situation, the air delivered from the dehumidifier would have substantially the condition represented by the points 3 in FIGS. 5 and 6, as this type of dehumidifier, in essence, combines the dehumidification and cooling functions which are separated in the apparatus shown in FIG. 1.

It will be apparent that various changes and modifications can be made from the specific details of the invention as discussed herein and shown in the attached drawings without departing from the spirit and scope of the attached claims.

What I claim is:

1. Apparatus for comfort conditioning of a closed space, said apparatus comprising a chemical dehumidifier including a desiccant which is regeneratable at given temperture, means for circulating air through said dehumidifier and to a space to be conditioned, a fixture, a source of artifical light mounted in said fixture for illuminating the space, a cooling means, a refrigerating unit having an energy input section, a cooling section and a heat rejection section, said cooling section being operatively connected with said cooling means to transfer heat from said cooling means to said cooling section, means for collecting heat energy given off by said lighting means and for utilizing such collected heat energy to perform work in said energy input section of said refrigerating unit, said refrigerating unit being effective, as a consequence of work performed in said input section, to transfer heat from said cooling section to said heat rejection section at a temperature above the given temperature, means for regenerating the desiccant of said dehumidifier, and means for transferring heat from said heat rejection section to said regenerating means and, at a temperature above the given temperature, to the desiccant of said dehumidifier.

2. Apparatus for comfort conditioning of a closed space, said apparatus comprising a chemical dehumidifier including a desiccant which is regeneratable at a given temperature, means for circulating air through said dehumidifier and to a space to be conditioned, a fixture, a source of artificial light mounted in said fixture for illuminating the space, a cooling means, a refrigerating unit having an energy input section, a cooling section comprising cold junctions of a thermoelectric circuit and a heat rejection section comprising hot junctions of said thermoelectric circuit, said cooling section being operatively connected with said cooling means to transfer heat from said cooling means to said cooling section, means comprising hot junctions of a second thermoelectric circuit for collecting heat energy given off by said lighting means and for utilizing such collected heat energy to perform work in said energy input section of said refrigerating unit, said refrigerating unit being effective, as a consequence of work performed in said input section, to transfer heat from said cooling section to said heat rejection section at a temperature above the given temperature, means for regenerating the desiccant of said dehumidifier, and means for transferring heat from said heat rejection section to said regenerating means and, at a temperature above the given temperature, to the desiccant of said dehumidifier.

3. Apparatus for comfort conditioning of a closed space, said apparatus comprising a chemical dehumidifier including a desiccant which is regeneratable at a given temperature, means for circulating air through said dehumidifier and to a space to be conditioned, a fixture, a source of artificial light mounted in said fixture for illuminating the space, a cooling means, a refrigerating unit having an energy input section, a cooling section comprising cold junctions of a thermoelectric circuit and a heat rejection section comprising hot junctions of said thermoelectric circuit, said cooling section being operatively connected with said cooling means to transfer heat from said cooling means to said cooling section, means comprising hot junctions of a second thermoelectric circuit for collecting heat energy given off by a light in said fixture and for utilizing such collected heat energy to perform work in said energy input section of said refrigerating unit, means for transferring heat energy from the cold junctions of said second thermoelectric circuit to at least one heat sink, said refrigerating unit being effective, as a consequence of work performed in said energy input section, to transfer heat from said cooling section to said heat rejection section, and means for transferring heat from said heat rejection section to at least one heat sink at a temperature above the given temperature, means for regenerating the desiccant of said dehumidifier, and means for transferring heat from said second-named heat sink to said regenerating means and, at a temperature above the given temperature, to the desiccant of said dehumidifier.

4. Apparatus as claimed in claim 3 wherein there is a single heat sink, and heat transfer is from said heat rejection section and from the cold junctions of said second thermoelectric circuit to said heat sink and from said heat sink to the desiccant of said dehumidifier.

5. Apparatus as claimed in claim 4 wherein the desiccant of said dehumidifier is a solid desiccant.

6. Apparatus as claimed in claim 4 wherein the desiccant of said dehumidifier is ethylene glycol.

7. Apparatus as claimed in claim 3, and including means responsive to the temperature of the space, and effective to control the transfer of heat from said cooling section to maintain a predetermined space temperature.

8. Apparatus as claimed in claim 3, and including means for reversing the energy input to said first thermoelectric circuit and conseqeuntly to cause heat transfer thereby from the associated heat sink to said cooling means.

9. Apparatus as claimed in claim 3, and including means responsive to the temperature of the space and effective to control heat transfer to at least one of said heat sinks to maintain a predetermined space temperature.

10. Appartaus as claimed in claim 3, and including cooling means comprising refrigerating apparatus, and effective to lower the sensible heat of air circulated in contact therewith, and wherein said apparatus includes means for circulating air discharged from said dehumidifier in thermal contact with said cooling means, prior to delivery thereof to the space to be conditioned.

11. Apparatus as claimed in claim 3, and including cooling means comprising refrigerating apparatus, and effective to lower the sensible heat of air circulated in contact therewith, and wherein said apparatus includes means for circulating air in thermal contact with said cooling means, through said dehumidifier, and then to the space to be conditioned.

12. Apparatus for comfort conditioning of a closed space, said apparatus comprising a chemical dehumidifier including a desiccant which is regeneratable at a given temperature, means for circulating air through said dehumidifier and to a space to be conditioned, a refrigerating unit having an energy input section, a cooling section and a heat rejection section, said cooling section being operatively connected with said cooling means to transfer heat from said cooling means to said cooling section, said refrigerating unit being effective to transfer heat from said cooling section to said heat rejection section at a temperature above the given temperature, means for regenerating the desiccant of said dehumidifier, and means for transferring heat from said heat rejection section to said regenerating means and, at a temperature above the given temperature, to the desiccant of said dehumidifier.

References Cited

UNITED STATES PATENTS

| | | | |
|---|---|---|---|
| 2,257,485 | 9/1941 | Sewell | 62—271 |
| 3,102,399 | 9/1963 | Meckler | 62—271 |
| 3,247,679 | 4/1966 | Meckler | 62—271 |
| 3,309,565 | 3/1967 | Clark | 62—3 |
| 3,403,723 | 10/1968 | Meckler | 62—3 |

WILLIAM J. WYE, Primary Examiner

U.S. Cl. X.R.

62—94, 259, 271